United States Patent
Tiruveedi et al.

(10) Patent No.: US 7,689,587 B1
(45) Date of Patent: *Mar. 30, 2010

(54) AUTOREP PROCESS TO CREATE REPOSITORY ACCORDING TO SEED DATA AND AT LEAST ONE NEW SCHEMA

(75) Inventors: Venkata R. Tiruveedi, Franklin, MA (US); Padma Krishnamoorthy, Shrewsbury, MA (US); Keith Alan Carson, Jr., Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 222 days.

This patent is subject to a terminal disclaimer.

(21) Appl. No.: 11/770,216

(22) Filed: Jun. 28, 2007

(51) Int. Cl.
*G06F 17/00* (2006.01)
*G06F 17/30* (2006.01)
*G06F 15/177* (2006.01)

(52) U.S. Cl. .................. 707/103 X; 707/1; 707/10; 707/100; 707/200; 709/220

(58) Field of Classification Search .......... 707/1–5, 707/10, 100, 102, 103 R–103 Z, 104.1, 200, 707/203, 205–206, 103 X; 717/108, 112, 717/121–122, 168–177; 706/45–50; 709/203, 709/217, 220
See application file for complete search history.

(56) References Cited

U.S. PATENT DOCUMENTS

| | | | | |
|---|---|---|---|---|
| 6,252,858 | B1* | 6/2001 | Inoue ........................ | 370/254 |
| 6,389,464 | B1* | 5/2002 | Krishnamurthy et al. .... | 709/220 |
| 6,606,690 | B2* | 8/2003 | Padovano ................... | 711/148 |
| 6,721,758 | B1* | 4/2004 | Jex et al. ................. | 707/103 R |
| 6,826,580 | B2* | 11/2004 | Harris et al. ................. | 707/202 |
| 7,107,534 | B1* | 9/2006 | de Jong et al. .............. | 715/734 |
| 2003/0212711 | A1* | 11/2003 | Fujibayashi et al. ......... | 707/200 |
| 2004/0025162 | A1* | 2/2004 | Fisk ............................ | 718/105 |
| 2005/0091233 | A1* | 4/2005 | Friske et al. ................. | 707/100 |
| 2005/0251523 | A1* | 11/2005 | Rajamani et al. ............ | 707/100 |

(Continued)

FOREIGN PATENT DOCUMENTS

EP 0907123 * 4/1999

(Continued)

OTHER PUBLICATIONS

Ramani Routray et al. "iSAN: Storage Area Network Management Modeling Simulation",International Conference on Networking, Architecture, and Storage (NAS 2007), 8 pages.*

(Continued)

*Primary Examiner*—Srirama Channavajjala
(74) *Attorney, Agent, or Firm*—Chapin IP Law, LLC

(57) ABSTRACT

Generating a repository template of a repository of data for a storage area network (SAN) management tool is disclosed. The repository will hold data describing SAN elements and configurations, and will be stored on a host. A configuration file is updated to include current configuration data for the repository, and includes specifications for a set of new schemas that define structures within the repository. A set of new schemas is created from those specifications. Seed data that defines initial information for the repository is copied to the host. New schemas are initialized with the seed data. A repository template is generated from the created set of new schemas and the seed data, from which one or more repositories may be created to hold SAN data.

14 Claims, 10 Drawing Sheets

U.S. PATENT DOCUMENTS

| | | | |
|---|---|---|---|
| 2006/0106819 A1* | 5/2006 | Dhanadevan et al. | 707/100 |
| 2006/0173912 A1* | 8/2006 | Lindvall et al. | 707/104.1 |
| 2007/0106683 A1* | 5/2007 | Grabelsky et al. | 707/102 |
| 2007/0156699 A1* | 7/2007 | Becker | 707/10 |
| 2007/0156848 A1* | 7/2007 | Becker et al. | 709/219 |
| 2007/0260712 A1* | 11/2007 | Jibbe | 709/220 |
| 2007/0294562 A1* | 12/2007 | Takamatsu et al. | 714/4 |

FOREIGN PATENT DOCUMENTS

| | | | |
|---|---|---|---|
| WO | WO 2004057798 | * | 7/2004 |
| WO | WO 2007044826 | * | 4/2007 |

OTHER PUBLICATIONS

C. DiCenzo,, "SAN Management Software Magic Quadrant", Research note, Apr. 22, 2003, 5 pages.*

Wilson Yong Hong Wang et al. "Design and development of Ethernet-based storage area network protocol", Computer Communications 29 (2006) 1271-1283.*

U.S. Appl. No. 60/639,162, filed Dec. 27, 2004.*

* cited by examiner

GENERATE A REPOSITORY TEMPLATE OF A REPOSITORY OF DATA FOR A STORAGE AREA NETWORK MANAGEMENT TOOL, THE REPOSITORY TO HOLD DATA DESCRIBING STORAGE AREA NETWORK ELEMENTS AND CONFIGURATIONS, THE REPOSITORY TO BE STORED ON A HOST, BY

301 UPDATE A CONFIGURATION FILE TO INCLUDE CURRENT CONFIGURATION DATA FOR THE REPOSITORY, WHEREIN THE CONFIGURATION FILE INCLUDES SPECIFICATIONS FOR A SET OF NEW SCHEMAS THAT DEFINE STRUCTURES WITHIN THE INITIAL REPOSITORY

302 CREATE A SET OF NEW SCHEMAS FOR THE REPOSITORY FROM THE SPECIFICATIONS IN THE CONFIGURATION FILE

306 PLACE A SET OF SCRIPTS IN A SINGLE SCRIPT FILE, WHEREIN THE SET OF SCRIPTS COMPRISES SCRIPTS USED TO GENERATE THE REPOSITORY TEMPLATE

303 COPY SEED DATA TO THE HOST, WHEREIN THE SEED DATA DEFINES INITIAL INFORMATION TO BE INCLUDED WITHIN A REPOSITORY

304 INITIALIZE NEW SCHEMAS WITH THE COPIED SEED DATA

305 GENERATE A REPOSITORY TEMPLATE FROM THE CREATED SET OF NEW SCHEMAS AND THE COPIED SEED DATA, THE REPOSITORY TEMPLATE CAPABLE OF CREATING ONE OR MORE REPOSITORIES TO HOLD STORAGE AREA NETWORK DATA

307 EXECUTE THE SINGLE SCRIPT FILE, WHEREIN THE SINGLE SCRIPT FILE IS USED TO GENERATE THE REPOSITORY TEMPLATE

FIG. 3

GENERATE A REPOSITORY TEMPLATE OF A REPOSITORY OF DATA FOR A STORAGE AREA NETWORK MANAGEMENT TOOL, THE REPOSITORY TO HOLD DATA DESCRIBING STORAGE AREA NETWORK ELEMENTS AND CONFIGURATIONS, THE REPOSITORY TO BE STORED ON A HOST, BY

↓

401 UPDATE A CONFIGURATION FILE TO INCLUDE CURRENT CONFIGURATION DATA FOR THE REPOSITORY, WHEREIN THE CONFIGURATION FILE INCLUDES SPECIFICATIONS FOR A SET OF NEW SCHEMAS THAT DEFINE STRUCTURES WITHIN THE INITIAL REPOSITORY

↓

407 USE CONFIGURATION DATA FROM THE CONFIGURATION FILE TO ACCESS A REPOSITORY CURRENTLY STORED ON THE HOST

↓

408 RESET THE CURRENTLY STORED REPOSITORY TO REMOVE ALL SCHEMAS AND DATA PRIOR TO CREATING THE SET OF NEW SCHEMAS THAT WILL DEFINE STRUCTURES WITHIN A REPOSITORY

↓

402 CREATE A SET OF NEW SCHEMAS FOR THE REPOSITORY FROM THE SPECIFICATIONS IN THE CONFIGURATION FILE

↓

403 COPY SEED DATA TO THE HOST, WHEREIN THE SEED DATA DEFINES INITIAL INFORMATION TO BE INCLUDED WITHIN A REPOSITORY

↓

404 INITIALIZE NEW SCHEMAS WITH THE COPIED SEED DATA

↓

405 GENERATE A REPOSITORY TEMPLATE FROM THE CREATED SET OF NEW SCHEMAS AND THE COPIED SEED DATA, THE REPOSITORY TEMPLATE CAPABLE OF CREATING ONE OR MORE REPOSITORIES TO HOLD STORAGE AREA NETWORK DATA

↓

TO FIG. 4B STEP 406

FIG. 4A

GENERATE A REPOSITORY TEMPLATE OF A REPOSITORY OF DATA FOR A STORAGE AREA NETWORK MANAGEMENT TOOL, THE REPOSITORY TO HOLD DATA DESCRIBING STORAGE AREA NETWORK ELEMENTS AND CONFIGURATIONS, THE REPOSITORY TO BE STORED ON A HOST, BY

501 UPDATE A CONFIGURATION FILE TO INCLUDE CURRENT CONFIGURATION DATA FOR THE REPOSITORY, WHEREIN THE CONFIGURATION FILE INCLUDES SPECIFICATIONS FOR A SET OF NEW SCHEMAS THAT DEFINE STRUCTURES WITHIN THE REPOSITORY

502 CREATE A SET OF NEW SCHEMAS FOR THE REPOSITORY FROM THE SPECIFICATIONS IN THE CONFIGURATION FILE

503 COPY SEED DATA TO THE HOST, WHEREIN THE SEED DATA DEFINES INITIAL INFORMATION TO BE INCLUDED WITHIN A REPOSITORY

504 INITIALIZE NEW SCHEMAS WITH THE COPIED SEED DATA

505 GENERATE A REPOSITORY TEMPLATE FROM THE CREATED SET OF NEW SCHEMAS AND THE COPIED SEED DATA, THE REPOSITORY TEMPLATE CAPABLE OF CREATING ONE OR MORE REPOSITORIES TO HOLD STORAGE AREA NETWORK DATA

506 CREATE THE REPOSITORY FROM THE REPOSITORY TEMPLATE, WHEREIN THE REPOSITORY INCLUDES THE SEED DATA AND THE SET OF NEW SCHEMAS

507 EXPORT A COPY OF THE CREATED REPOSITORY

508 USE THE EXPORTED COPY OF THE REPOSITORY TO TROUBLESHOOT ERRORS IN THE REPOSITORY

FIG. 5

AUTOREP PROCESS TO CREATE REPOSITORY ACCORDING TO SEED DATA AND AT LEAST ONE NEW SCHEMA

CROSS-REFERENCE TO RELATED APPLICATION

This application relates to the following application, filed on the same date as the present application, entitled "DATA REPOSITORY UPGRADE PROCESS", identified by U.S. application Ser. No. 11/772,805. The teachings and disclosure of this filed application are each incorporated by reference herein in their entirety.

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a user) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Certain console applications include Graphical User Interface (GUI) software programs that enable network managers to graphically manage, control and configure various types of hardware and software resources or managed entities associated with a corresponding managed network. In one conventional storage area network management application, rendering the graphical user interface enables the network manager to graphically select, interact with, and manage local or remote devices and associated software processes operating in the network. More specifically, based on use of the graphical user interface in combination with an input device such as a hand operated keyboard and/or mouse and corresponding pointer displayed on a viewing screen, a network manager is able to manage hardware and software entities such as storage devices, peripherals, network data communications devices, and so forth associated with the network. Typically, in such network management applications, a network manager may select a displayed icon representing a corresponding resource in the storage area network and apply a management command in order to display corresponding management information.

Enterprise Storage Networks are large and complex environments that include various elements such as storage arrays, switches, hosts and databases all inter-networked. These elements occur in several hundreds in such environments. These elements in turn may consist of several hundred thousands of manageable elements such as storage devices, storage and switch ports, database instances, host devices and file systems, and the like. Management of such environments is a daunting task and typically requires Storage Resource Management solutions such as EMC's Control Center (ECC) family of products, available from EMC Corporation of Hopkinton, Mass. ECC includes agents that are deployed on storage elements for the purpose of gathering data about these elements, components that process and persist data, applications that use persisted information to enable the management of these environments. ECC identifies the entire process of retrieving the collected data from agents to data persistence as a transaction.

SUMMARY

Storage resource management solutions, such as ECC, must store the vast amounts of data gathered by agents. Typically, a dedicated storage device or entity is created for this purpose, known as a repository. A repository is a database, configured according to the needs of the storage resource management solution to hold agent-gathered data. In the case of ECC, the repository is configured with a number of schemas (that is, data storage structures) that organize the agent-gathered data so that ECC is able to process, display, and otherwise manipulate that data in an efficient way. Storage resource management solutions like ECC are not static applications, but rather are constantly undergoing revisions to improve their functionality. As a storage resource management solution changes over time, the repository in which agent-gathered data is stored by that solution may also need to change. For example, a storage resource management solution like ECC may be updated to gather and display types of data about a storage area network that were not previously collected and stored. The repository, then, needs to be changed so that it is able to properly store those new types of data.

Conventional technologies for manifesting such changes in a repository require starting with an empty repository (i.e., database) and gathering all of the data files, control files, and other files that are used in the creation of the repository. A number of scripts are then executed to create the repository, one at a time. After each script is executed, errors are checked for and corrected as need be before executing the next script. This is a time-consuming process that consumes a great deal of computing resources and must be repeated for any repository that is being changed, as well as for each time a change is made. Embodiments disclosed below significantly overcome such a problem by providing for an automatic repository generation application that is able to be executed in a more efficient manner, resulting in less processing overhead and a faster repository creation time, especially through the use of automatically generated upgrade scripts and a repository template that may be used to create other repositories. A configuration file is updated to include current configuration data for the repository. Configuration data may include such things as specifications for a set of schemas (i.e., data structures) for the repository. Using those specifications, a set of new schemas is created. Some of these schemas are populated with initial data known as seed data. Seed data is copied to the system (i.e., host) where the repository is being created. The seed data defines initial information to be included within the repository, and is used to initialize some new schemas. A repository template is then generated from the created set of new schemas and the copied seed data. The repository template may then be used in other locations (i.e., hosts) to create a repository with that basic necessary information and structure to hold storage area network data. Finally, the repository is itself created, by using the repository template, and thus includes both the set of new schemas and the seed data.

More particularly, in an embodiment there is provided a method of generating a repository template of a repository of data for a storage area network management tool. The repository is to hold data describing storage area network elements and configurations, and the repository is to be stored on a host. The method includes updating a configuration file to include current configuration data for the repository, wherein the configuration file includes specifications for a set of new schemas that define structures within the repository. The method also includes creating a set of new schemas for the repository from the specifications in the configuration file, copying seed data to the host, wherein the seed data defines initial information to be included within a repository, and initializing new schemas with the copied seed data. The method further includes generating a repository template from the created set of new schemas and the copied seed data, the repository template capable of creating one or more repositories to hold storage area network data.

In a related embodiment, creating a new set of schemas may include placing a set of scripts in a single script file, wherein the set of scripts comprises scripts used to generate the repository template. Further, generating the repository template may include executing the single script file, wherein the single script file is used to generate the repository template.

In another related embodiment, the method may include using configuration data from the configuration file to access a repository currently stored on the host, and resetting the currently stored repository to remove all schemas and data prior to creating the set of new schemas that will define structures within a repository. In a further related embodiment, the method may include creating the repository from the repository template, wherein the repository includes the seed data and the set of new schemas. The method may also include loading a prior version of the repository onto the same host that includes the created repository, and comparing the schemas of the prior version of the repository with the schemas of the created repository to determine any differences, and creating scripts that, when executed on a version of a repository that corresponds to the prior version of the repository, will upgrade the schemas to the schemas found in the created repository. In another further related embodiment, comparing may include performing a comparison on each component structure of the schemas of the prior version of the repository one at a time, and creating may include creating scripts that, when executed on a version of a repository that corresponds to the prior version of the repository, will upgrade the schemas to the schemas found in the created repository by adding any new structures to the schemas of the version corresponding to the prior version of the repository and moving data to any such new structures prior to removing any structures that are not present in the created repository.

In still another related embodiment, the method may include exporting a copy of the created repository, and using the exported copy of the repository to troubleshoot errors in the repository. In yet another related embodiment, the method may include copying the repository template to a location, wherein copying signals an install kit generator that the repository template is available, and generating an install kit from the repository template, wherein the install kit allow for a clean install of a repository on a host.

In still yet another related embodiment, the method may include testing a configuration of the host that will store the repository prior to beginning creation of the repository. In yet still another related embodiment, the method may include creating a repository of data from the repository template, wherein the repository includes the seed data and the set of new schemas. In still another related embodiment, the method may include determining a result of the generation of the repository template, wherein the result may be success or failure, and communicating the result of the generation of the repository template.

In another embodiment there is provided a computer system including a memory, a processor, a display, a communications interface, and an interconnection mechanism coupling the memory, the processor, the display, and the communications interface, allowing communication there between. The memory is encoded with an automatic repository generation application, that when executed in the processor, provides an automatic repository generation process that generates a repository template of a repository of data for a storage area network management tool. The repository is to hold data describing storage area network elements and configurations, and the repository is to be stored on a storage device operably coupled to the computer system. The automatic repository generation process causes the computer system to perform the operations of updating a configuration file to include current configuration data for the repository, wherein the configuration file includes specifications for a set of new schemas that define structures within the repository. The automatic repository generation process also causes the computer system to perform operations of creating a set of new schemas for the repository from the specifications in the configuration file, copying seed data to the storage device, wherein the seed data defines initial information to be included within a repository, and initializing new schemas with the copied seed data. The automatic repository generation process also causes the computer system to perform operations of generating a repository template from the created set of new schemas and the copied seed data, the repository template capable of creating one or more repositories to hold storage area network data.

In yet another embodiment there is provided a computer program product, stored on computer readable medium, to generate a repository template of a repository of data for a storage area network management tool. The repository is to hold data describing storage area network elements and configurations, and the repository is to be stored on a host. The computer program product includes computer program code for updating a configuration file to include current configuration data for the repository, wherein the configuration file includes specifications for a set of new schemas that define structures within the repository. The computer program product also includes computer program code for creating a set of new schemas for the repository from the specifications in the configuration file, computer program code for copying seed data to the host, wherein the seed data defines initial information to be included within a repository, and computer program code for initializing new schemas with the copied seed data. The computer program product further includes computer program code for generating a repository template from the created set of new schemas and the copied seed data, the repository template capable of creating one or more repositories to hold storage area network data.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate the Control Center (ECC) software. Control Center software is manufactured by EMC Corporation of Hopkinton, Mass., USA.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 illustrates a flowchart of a procedure performed by the system of FIG. 1 when creating a repository of data for a storage area network management tool by using a single script file that includes a set of scripts that are used to create the repository.

FIGS. 4A-4B illustrate a flowchart of a procedure performed by the system of FIG. 1 when comparing a prior version of the repository with the version of the repository created from a repository template, and creating upgrade scripts that will upgrade a prior version of the repository to a version of the created repository.

FIG. 5 illustrates a flowchart of a procedure performed by the system of FIG. 1 when exporting a copy of the created repository to troubleshoot errors therein.

DETAILED DESCRIPTION

Generally, disclosed embodiments include methods and apparatus to create a repository that will hold data describing one or more storage area network(s), including the components and the connections there between. A configuration file is updated to include current configuration data for the repository. Configuration data may include such things as specifications for a set of schemas (i.e., data structures) for the repository. Using those specifications, a set of new schemas is created. Some of these schemas are populated with initial data known as seed data. Seed data is copied to the system (i.e., host) where the repository is being created. The seed data defines initial information to be included within the repository, and is used to initialize some new schemas. A repository template is then generated from the created set of new schemas and the copied seed data. The repository template may then be used in other locations (i.e., hosts) to create a repository with that basic necessary information and structure to hold storage area network data. Finally, the repository is itself created, by using the repository template, and thus includes both the set of new schemas and the seed data. Scripts that will automatically upgrade an existing repository may also be created.

Figure 1:
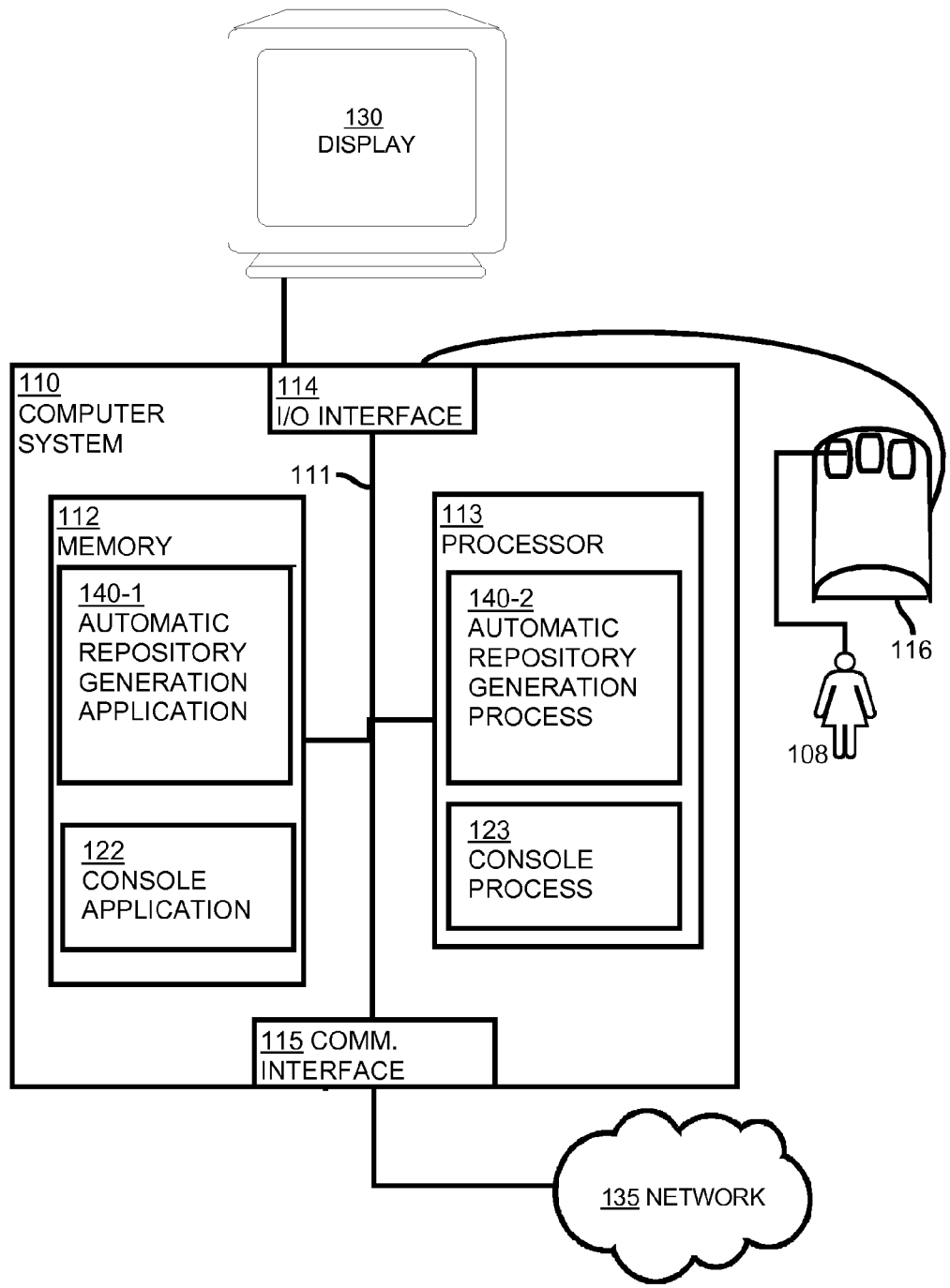
FIG. 1 shows a high-level block diagram of a computer system according to one embodiment disclosed herein.
Figure 2:
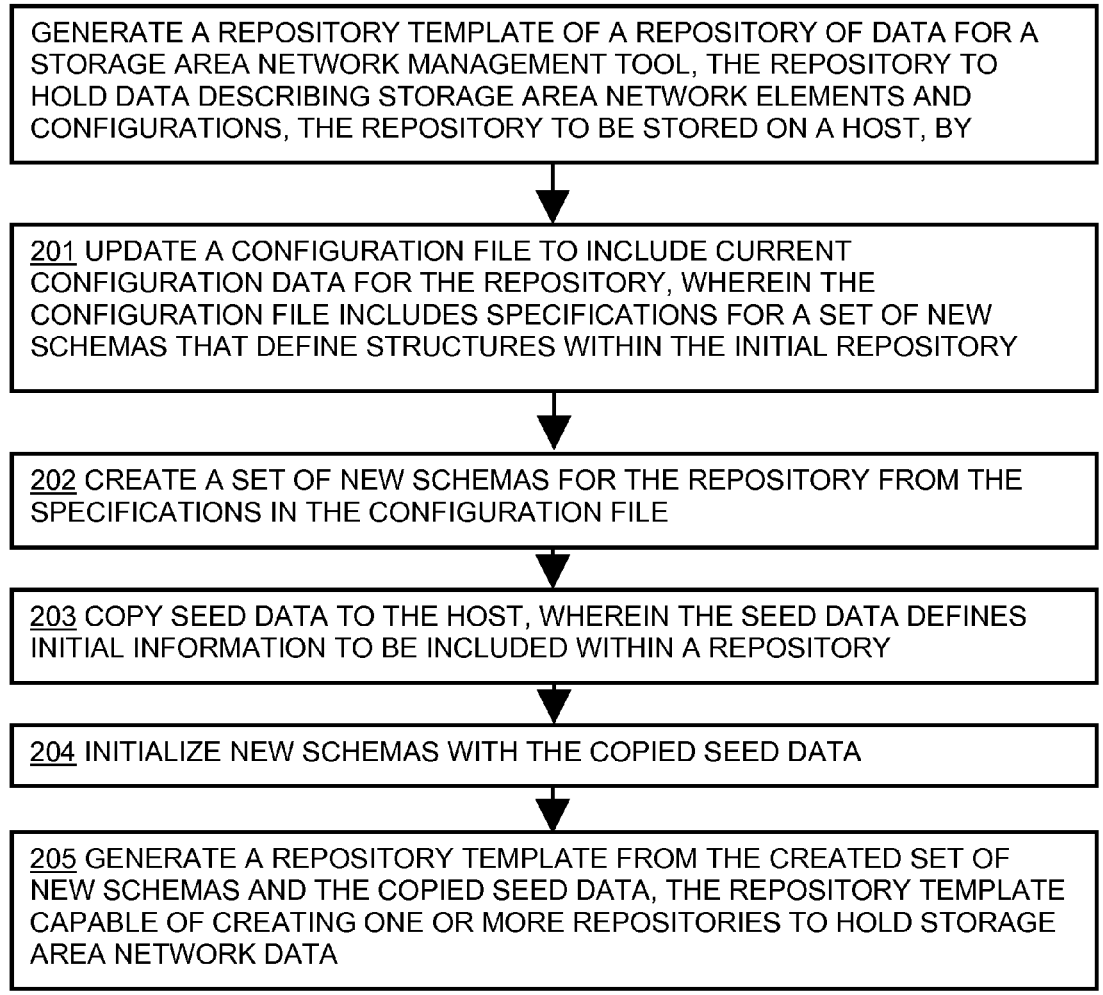
FIG. 2 illustrates a flowchart of a procedure performed by the system of FIG. 1 when creating a repository of data for a storage area network management tool.

More particularly, FIG. 1 is a block diagram illustrating example architecture of a computer system 110 that executes, runs, interprets, operates or otherwise performs an automatic repository generation application 140-1 and an automatic repository generation process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, touchpad, trackball, etc.) couples to the processor 113 through the I/O interface 114 and enables a user 108 such as a system administrator of a storage area network (SAN) to provide input commands and generally administer the SAN through the graphical user interface (not shown) that is provided on a display 130. The communications interface 115 enables the computer system 110 to communicate with other devices (e.g., components of the SAN) on a network 135.

The memory system 112 is any type of computer readable medium and in this example is encoded with an automatic repository generation application 140-1 that includes an automatic repository generation process 140-2. The memory system 112 also includes a cache 120, referred to throughout as a second cache 120. The memory system 112 may further include a first cache 126, or the first cache 126 may be located in a separate memory unit 127 that the computer system 110 communications with via the communications interface 115, as shown in FIG. 1. The automatic repository generation application 140-1 may be embodied as software code such as data and/or logic instructions (e.g., code stored in the memory system 112 or on another computer readable medium such as a removable disk) that supports processing functionality according to different embodiments described herein. A console application 122 may also be embodied as software code in the memory system 112. During operation of the computer system 110, the processor 113 accesses the memory system 112 via the interconnection mechanism 111 in order to launch, run, execute, interpret or otherwise perform the logic instructions of the automatic repository generation application 140-1 as well as the console application 122. Execution of the automatic repository generation application 140-1 in this manner produces processing functionality in an automatic repository generation process 140-2. Similarly, execution of the console application 122 produces processing functionality in a console process 123. In other words, the automatic repository generation process 140-2 represents one or more portions or runtime instances of the automatic repository generation application 140-1 performing or executing within or upon the processor 113 in the computer system 110 at runtime.

It is noted that example configurations disclosed herein include the automatic repository generation application 140-1 itself including the automatic repository generation process 140-2 (i.e., in the form of un-executed or non-performing logic instructions and/or data). The automatic repository generation application 140-1 may be stored on a computer readable medium (such as a floppy disk), hard disk, electronic, magnetic, optical or other computer readable medium. The automatic repository generation application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the automatic repository generation application 140-1 in the processor 113 as the automatic repository generation process 140-2. Those skilled in the art will understand that the computer system 110 may include other processes and/or software and hardware components, such as an operating system not shown in this example.

A number of flowcharts of the presently disclosed method are illustrated in FIGS. 2-9. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order. More specifically, FIGS. 2-9 illustrate various flowcharts of procedures performed by the system of FIG. 1 when creating a repository according to embodiments described herein.

The automatic repository generation application 140-1, when executing as the automatic repository generation process 140-2, uses a number of script files to achieve the functions described herein. There is a time limit on each file, such that if any of the files times out prior to completing its tasks, an error message is created and logged. This prevents the automatic repository generation process 140-2 from hanging at any step. Any logged messages are stored in a particular log file for the automatic repository generation process 140-2. Some logged messages may be redirected to another log file from which the message may be output to a display device, such as the display device 130 shown in FIG. 1. Error messages may include the following, but are not limited to these example messages. A timeout error is created whenever a script file times out prior to completing its execution. A timeout error may also be generated if the automatic repository generation process 140-2 does not export a copy of the created repository. An unsuccessful build message indicates that the automatic repository generation process 140-2 did not successfully create the repository. An unsuccessful upgrade message indicates that the automatic repository generation process 140-2 did not successfully create the upgrade scripts that may be used to upgrade a version of a first repository to a version of the repository. For any error message, the error logs may be viewed to help troubleshoot the error.

The computer system 110 includes a listening application, that executes as a listening process (not shown in FIG. 1), that may be running at all times, or at any particular times as determined by a user or other configuration. The listening process looks for a particular file (or files) in a particular directory in the storage device 112 of the computer system (or in another storage device in communication with the computer system 110 via the communications interface 115). The file contains information that is used by the automatic repository generation application 140-1, such as but not limited to details of the build view label, version of the database software used by the repository, and the like. This file is sent to the directory by another process whenever a new version of the repository needs to be created. Other files used/by the automatic repository generation application 140-1 may be acquired from another storage device accessed by the computer system 110 via the network 135.

The placement of the particular file in the particular directory triggers execution of the automatic repository generation application 140-1 as the automatic repository generation process 140-2. Actions performed by the automatic repository generation process 140-2 are shown in detail in FIG. 2. The automatic repository generation process 140-2 first updates a configuration file to include current configuration data for the repository, step 201. The configuration file includes specifications for a set of new schemas that define structures within the repository. That is, the configuration file includes data that describe how the repository is to be structured in terms of holding data. For example, the configuration file will include specifications for the various tables, columns, rows, and other data structures that will make up the repository, such as but not limited to identifier, size, types of data held therein, and so forth. The configuration file may also include information describing the computer system 110 on which the automatic repository generation process 140-2 executes, access information (i.e., a username and password) for that computer system, access information for an existing repository (if any) that the automatic repository generation process 140-2 may access during execution, and the like.

The automatic repository generation process 140-2 uses the specifications from the configuration file to create a set of new schemas for the repository, step 202. All structures as defined in the specifications from the configuration file are created, in accordance with those specifications. For example, if the specifications file defines a table with eight columns and an unlimited number of rows to hold data that describes different storage elements of a storage area network, such a table is created for the repository with that form (i.e., eight columns, unlimited rows, data therein relates to storage elements). The schemas created by the automatic repository generation process 140-2 may be as complicated or as simple as the underlying repository (i.e. database) software itself will allow. The only requirement is that the specifications of any schema are found in the configurations file.

Certain schemas created by the automatic repository generation process 140-2 may be "new", that is, may not have been found in a previous version of the repository, or may be designed to hold data that has not been collected previously, or displayed previously. The automatic repository generation process 140-2 populates such structures with seed data by copying seed data to the host (i.e., the computer system 112 where the automatic repository generation process 140-2 is executing), step 203. The seed data defines initial information to be included within a repository. Seed data may include, but is not limited to, "dummy" data that is not data gathered from an actual storage area network, but rather is created to serve as a placeholder. Alternatively, seed data may be real data collected from a different storage area network than one that is to be managed by the copy of ECC that will interface with this particular repository. Thus, while seed data may seem very similar to storage area network data, it need not be actual data taken from a storage area network.

With the seed data locally available, the automatic repository generation process 140-2 next initializing new schemas with the copied seed data, step 204. The automatic repository generation process 140-2 may also place seed data into schemas that existed in a prior repository (or repository version), or into schemas that the automatic repository generation process 140-2 has effectively modified from a previous repository or repository version. In other words, an older version of the repository may have included a table describing host bus adaptors of a storage area network. The specifications file may define this table in a new way, so that it includes new columns not present in the prior version of the repository. When the automatic repository generation process 140-2 creates those new columns, they may lack any data, while the other columns of the table include data, because agents have collected those kinds of data for the prior version of the repository. The automatic repository generation process 140-2 may then place seed data into those otherwise empty columns.

The automatic repository generation process 140-2 takes the created set of new schemas and the copied seed data, and uses them to generate a repository template, step 205. A repository template is capable of being used to create one or more repositories to hold storage area network data. The repository template will include all of the necessary structures and initial data from which a repository may be created, but does not necessarily include particulars for a repository. For example, a repository template need not define a name for a repository, or include previously collected data that describes a storage area network. This allows the repository template to be portable so that, for example, a variety of ECC users may use the repository template to create a repository for their particular copy of ECC, and then include data pertaining to their storage area network(s) in the repository.

In one embodiment, the automatic repository generation process 140-2 creates a number of files. These include an export of the repository template (including seed data) after the automatic repository generation process 140-2 has completed, which may be used to generate upgrade files for a next version of the repository. Another file may include information about the view label on which the automatic repository generation process 140-2 is executed. Yet another file may be a set of one or more repository template files, as well as a set of one or more SQL files that may be run to upgrade to the current version of the repository from a previous version. Finally, the automatic repository generation process 140-2 may create a dump of the seed data, as explained below in greater detail with regards to FIG. 6.

In FIG. 3, the automatic repository generation process 140-2 utilizes a single script file that includes a set of scripts that are used to create the repository. The automatic repository generation process 140-2 first updates a configuration file to include current configuration data for the repository, step 301. The configuration file includes specifications for a set of new schemas that define structures within the repository, and may include other information as is described above. The automatic repository generation process 140-2 then creates a set of new schemas for the repository from the specifications in the configuration file, step 302. Prior to this, the automatic repository generation process 140-2 places a set of scripts in a single script file, step 306. The set of scripts comprises scripts that are used to generate the repository template from the repository template. The automatic repository generation process 140-2 then copies seed data to the host, step 303. As described above, the seed data defines initial information to be included within a repository, and may also be used herein to re-initialize a created repository after it is tested (see FIG. 6 for more details). The automatic repository generation process 140-2 then initializes new schemas with the copied seed data, step 304, and generates a repository template from the created set of new schemas and the copied seed data, step 305. The repository template is capable of being used to create one or more repositories to hold storage area network data. The automatic repository generation process 140-2 may execute the single script file, step 307, to generate the repository template. In an embodiment, the single script file, when executed, clears the repository, generates new schemas, imports the seed data into the generated new schemas, and then generates the template.

Figure 4B:
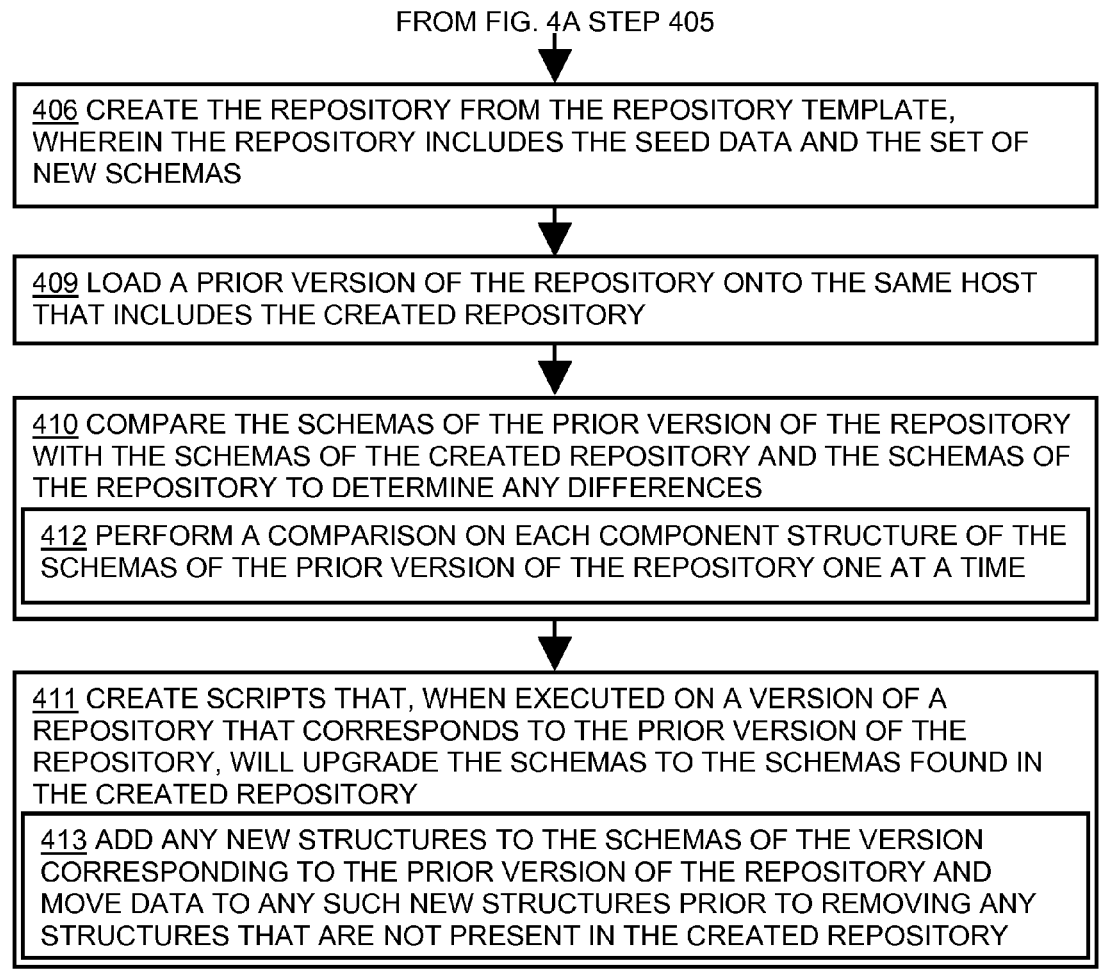

FIGS. 4A-4B show how the automatic repository generation process 140-2 compares a created repository with a prior version of the repository, and uses the comparison to produce upgrading scripts. The upgrading scripts, when executed, will upgrade a repository comparable or otherwise of the same version as the prior version of the repository to the created repository (i.e., to the same version of the repository as the created repository). The automatic repository generation process 140-2 first updates a configuration file to include current configuration data for the repository, step 401. The configuration file includes specifications for a set of new schemas that define structures within the repository, and may include other information as is described above. The automatic repository generation process 140-2 may then use configuration data from the configuration file to access a repository currently stored on the host (i.e., computer system 110), step 407. The configuration file would thus have to include the information needed to access that repository, such as but not limited to a username/login and a password. The automatic repository generation process 140-2 then clears the currently stored repository by resetting the repository to remove all schemas and data prior to creating the set of new schemas that will define structures within a repository, step 408. The automatic repository generation process 140-2 may need to perform these steps any time that an existing (i.e., current) repository is already on the host, as opposed to clean install situations (described in greater detail below with regards to FIG. 6).

The automatic repository generation process 140-2 then creates a set of new schemas for the repository from the specifications in the configuration file, step 402, and copies seed data to the host, step 403. As described above, the seed data defines initial information to be included within a repository. The automatic repository generation process 140-2 then initializes new schemas with the copied seed data, step 404, and generates a repository template from the created set of new schemas and the copied seed data, step 405. The repository template is capable of being used to create one or more repositories to hold storage area network data. The automatic repository generation process 140-2 then creates the repository from the repository template, step 406.

To create upgrade scripts, the automatic repository generation process 140-2 first loads a prior version of the repository onto the same host that includes the created repository, step 409. The prior version serves as a baseline from which comparisons may be made to produce the upgrade scripts. The prior version should be the version of the repository that is immediately before the version of the created repository. In other words, versions usually follow a particular sequence or order, such that upgrades are only possible from the most recent prior version in the sequence. For example, if the version history of a repository is 1.0, 1.1, 1.2, 2.0, 2.1, 3.0, 3.1, 3.2, and 4.0, it is usually not possible to upgrade from version 1.0 to version 3.0. First, the repository would need to be upgraded from version 3.0 to version 3.1, and then from version 3.1 to version 3.2. Applying this example to the current invention, if the created repository was version 4.0, the automatic repository generation process 140-2 would load version 3.2 of the repository onto the same host.

The automatic repository generation process 140-2 then performs a comparison between the schemas of the prior version of the repository and the schemas of the created repository to determine any differences, step 410. For example, the created repository (that is, the one created using the repository template generated by the automatic repository generation process 140-2) may include a number of tables not present in the prior version of the repository. The comparison will find these tables and identify them as belonging to only the created repository. The upgrade script(s) will thus have to include instructions to add these tables when changing from the prior version of the repository to the current repository (which is the upgraded version of the repository, compared to the prior version). The automatic repository generation process 140-2 performs the comparison on each component structure of the schemas of the prior version of the repository one at a time, step 412. This decreases the chance of error that may occur with in comparing many structures at once, as structures and/or schemas may be interrelated, and these relationships may change from one repository to the other. After the automatic repository generation process 140-2 performs the comparisons, the automatic repository generation process 140-2 creates scripts that, when executed on a version of a repository that corresponds to the prior version of the repository, will upgrade the schemas to the schemas found in the created repository, step 411. One way in which the upgrade may be performed is to add any new structures to the schemas of the version corresponding to the prior version of the repository, and then move data to any such new structures, prior to removing any structures that are not present in the created repository, step 413. That is, no structures or data are deleted until all other changes (i.e., additions and modifications) are made. This guarantees that data is not lost, and allows the upgrade to be performed on top of the existing repository, the benefits of which are explained in co-pending application Ser. No. 11/772,805, entitled "DATA REPOSITORY UPGRADE PROCESS" filed on the same date herewith and which is incorporated by reference in its entirety. Other scenarios involving the changing of schemas and the moving of data from schemas of a prior version of a repository to an upgraded version of a repository are described therein, and may be applied to the above situation.

In FIG. 5, the automatic repository generation process 140-2 troubleshoots errors in a repository from an exported copy of the repository. The automatic repository generation process 140-2 first updates a configuration file to include current configuration data for the repository, step 501. The configuration file includes specifications for a set of new schemas that define structures within the repository, and may include other information as is described above. The automatic repository generation process 140-2 then creates a set of new schemas for the repository from the specifications in the configuration file, step 502, and copies seed data to the host, step 503. As described above, the seed data defines initial information to be included within a repository, and is also used herein to create the test environment. The automatic repository generation process 140-2 then initializes new schemas with the copied seed data, step 504, and generates a repository template from the created set of new schemas and the copied seed data, step 505. The repository template is capable of being used to create one or more repositories to hold storage area network data. The automatic repository generation process 140-2 then creates the repository from the repository template, step 506. With the repository created, the automatic repository generation process 140-2 exports a copy of the created repository, step 507. The created repository may include errors in one or more schemas, errors in where data is placed, and the like. A troubleshooting application, which may be part of the automatic repository generation process 140-2, but may also be a separate application that the automatic repository generation process 140-2 may call or otherwise instruct to execute, then uses the exported copy of the repository to troubleshoot errors in the repository, step 508.

Figure 6:
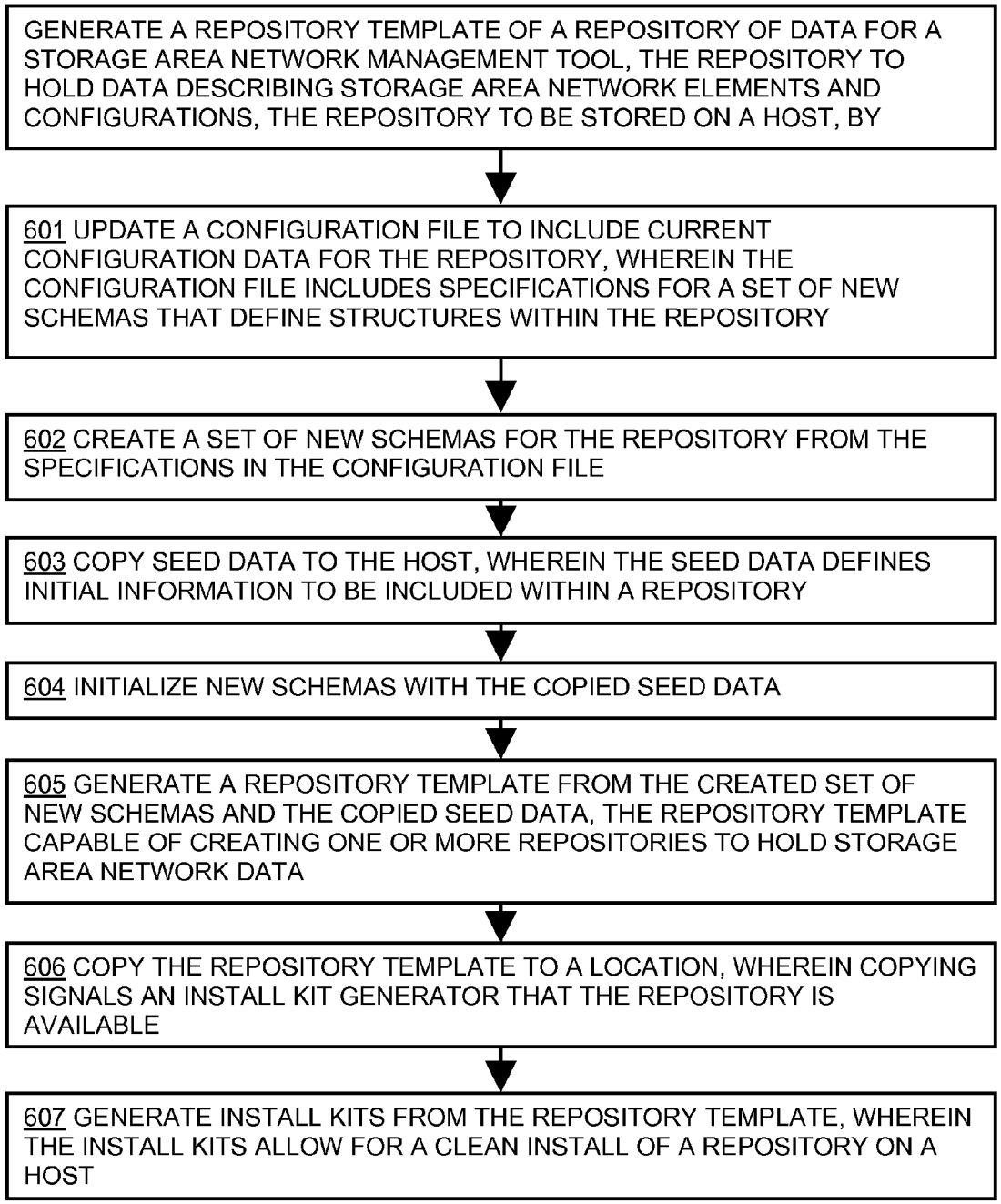
FIG. 6 illustrates a flowchart of a procedure performed by the system of FIG. 1 when creating install kit from the repository.

FIG. 6 illustrates how the automatic repository generation process 140-2 signals that an install kit (or kits) may be generated from the repository template. An install kit may be used to install a copy of repository on a different host or other computer system 110 capable of storing the repository. The automatic repository generation process 140-2 first updates a configuration file to include current configuration data for the repository, step 601. The configuration file includes specifications for a set of new schemas that define structures within the repository. The automatic repository generation process 140-2 then creates a set of new schemas for the repository from the specifications in the configuration file, step 602, and copies seed data to the host, step 603. As described above, the seed data defines initial information to be included within a repository, and is also used herein to create the test environment. The automatic repository generation process 140-2 then initializes new schemas with the copied seed data, step 604, and generates a repository template from the created set of new schemas and the copied seed data, step 605. The repository template is capable of being used to create one or more repositories to hold storage area network data.

After the automatic repository generation process 140-2 generates the repository template, the automatic repository generation process 140-2 may copy the repository template to a location, step 606. This location may be a particular folder or directory that is accessible to the automatic repository generation process 140-2. In one embodiment, the directory may be located within the memory 112 of the computer system 110. Alternatively, the directory may be located in a separate storage device, or other computer system, that is accessible via the network 135 and the communications interface 115. When the automatic repository generation process 140-2 performs the copy operation, this signals an install kit generator that the repository is available, so that one or install kits may be created. The install kit generator (which may, in some embodiments, be part of the automatic repository generation process 140-2, but is not so limited to being a part) will then generate an install kit from the repository template, step 607. The install kit allows for a clean install of a repository on a host (i.e., a computer system). A clean install is an installation of the repository from scratch, that is, with no previous version or repository present in the location where the clean install is being performed. A clean install may be needed when, for example, a new user of ECC (or any storage resource management application) installs ECC on a system to manage a storage area network, and needs a repository for ECC to store data in. In such a situation, the new user has never before had ECC, and thus does not have a previous version or installation of the repository. Alternatively, a current user of ECC may have errors or other issues with their repository, which troubleshooting or other error correction mechanisms may not have solved. To perform a clean install, the error-filled repository is removed completely, and an install kit is executed.

After a customer or other user performs a clean install of a repository using an install kit, the customer is likely to use the repository in a dummy or test environment prior to making actual use of it. This allows a user to become familiar with the repository, whether they are a first-time user or have used a previous version of the repository. When the user is ready to bring the repository into actual use, the user may have to remove the repository and re-install it using the install kit. This may be a time-consuming process and may thus delay the start of actual use of the repository. Instead, if the user had access to the seed data used by the automatic repository generation process 140-2, the user could simply re-initialize the repository with the seed data, instead of having to start from scratch. To provide this seed data, the automatic repository generation process 140-2 may export a copy of all schemas that include seed data. The install kit generation process may then include a copy of the exported seed data within any install kits, so that the exported seed data is sent to users.

Figure 7:
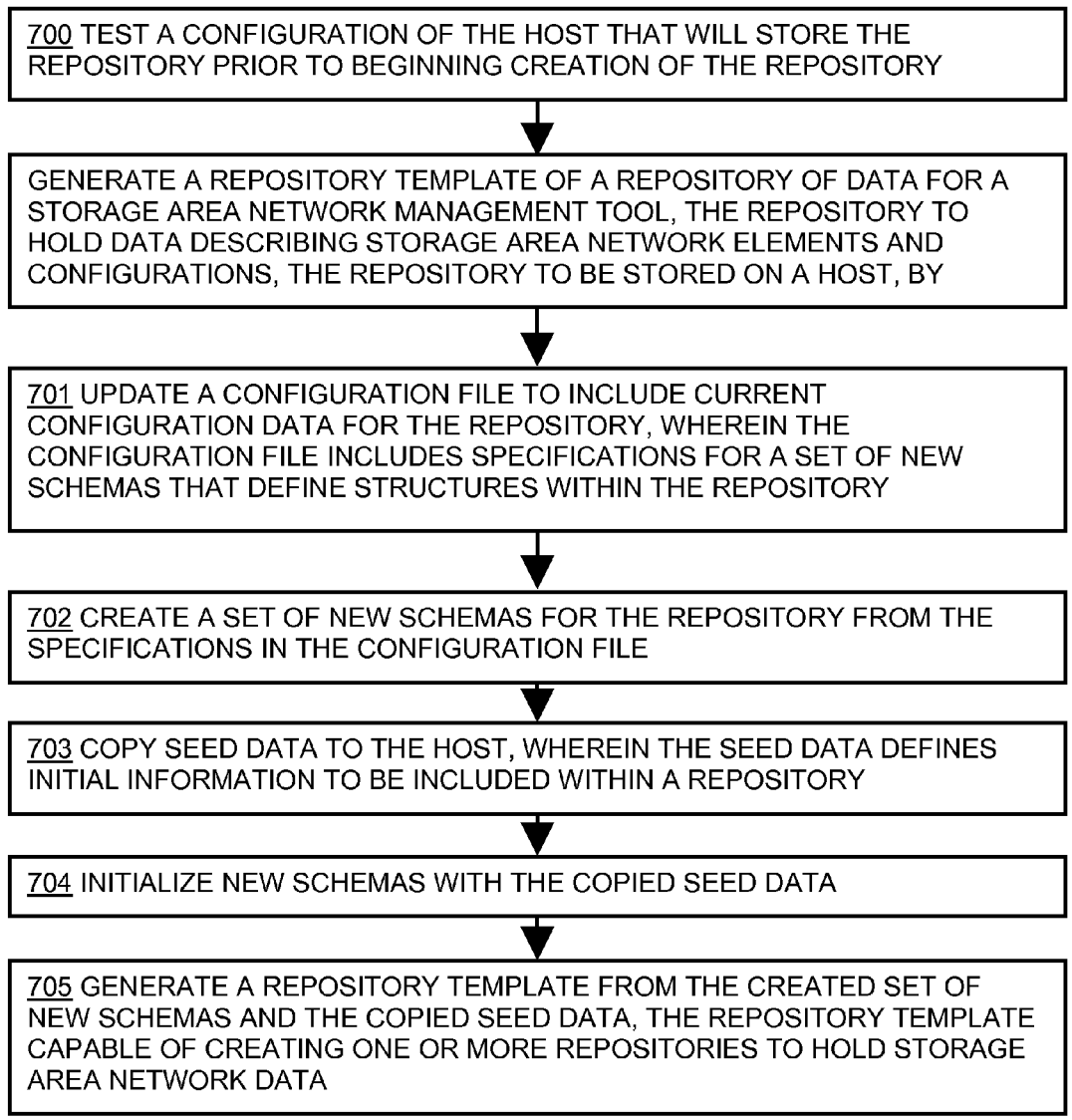
FIG. 7 illustrates a flowchart of a procedure performed by the system of FIG. 1 when testing the configuration of a host that will store the repository.

In FIG. 7, the automatic repository generation process 140-2 tests the configuration of a host that stores the repository, prior to the creation of the repository. In other words, before performing any of the steps described above in regards to FIGS. 2-6, or those described below in regards to FIGS. 8-9, the automatic repository generation process 140-2 must first ascertain that the host that will store the repository is able to do so. The automatic repository generation process 140-2 thus tests a configuration of the host (i.e., computer system, such as but not limited to the computer system 110 shown in FIG. 1) that will store the repository prior to beginning creation of the repository, step 700. The automatic repository generation process 140-2 may test the configuration by gathering information about the host, such as but not limited to storage capacity, data transfer rate, and the like. The automatic repository generation process 140-2 may also test as any repository or repositories that are currently stored on the host. For example, the automatic repository generation process 140-2 may include test functions that simulate data being delivered to the repository by agents and check to see how the repository responds. Any testing protocols or procedures may be incorporated in the automatic repository generation process 140-2. The automatic repository generation process 140-2 may require information about an underlying repository stored on the host, such as but not limited to access information (i.e., username/login and password). The automatic repository generation process 140-2 may acquire this information from the configuration file or from another source.

Figure 8:
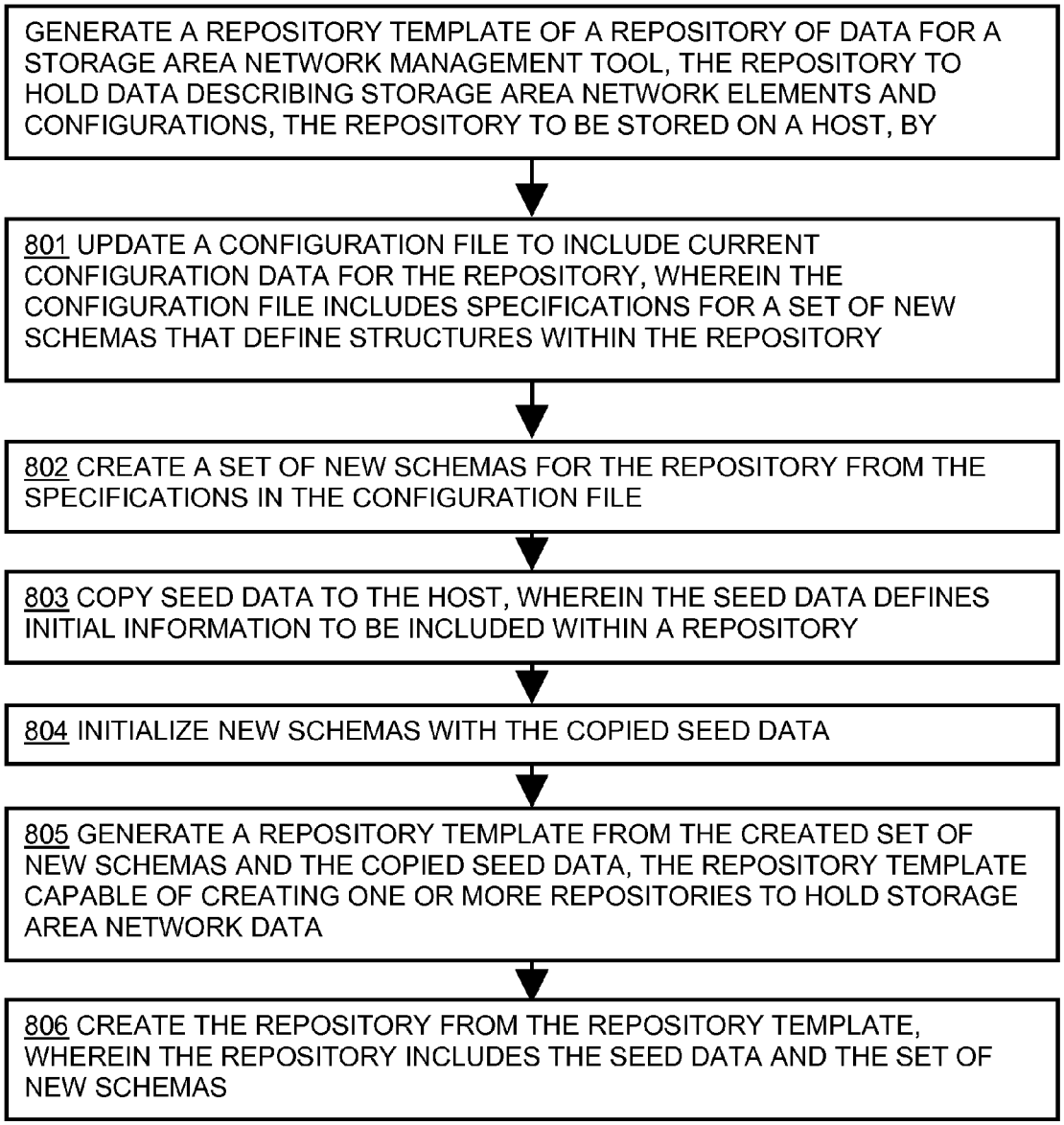
FIG. 8 illustrates a flowchart of a procedure performed by the system of FIG. 1 when creating a repository from the repository template.

FIG. 8 shows how the automatic repository generation process 140-2 creates a repository of data from a generated repository template. The automatic repository generation process 140-2 first updates a configuration file to include current configuration data for the repository, step 801. The configuration file includes specifications for a set of new schemas that define structures within the repository. The automatic repository generation process 140-2 then creates a set of new schemas for the repository from the specifications in the configuration file, step 802, and copies seed data to the host, step 803. As described above, the seed data defines initial information to be included within a repository, and is also used herein to create the test environment. The automatic repository generation process 140-2 then initializes new schemas with the copied seed data, step 804, and generates a repository template from the created set of new schemas and the copied seed data, step 805. The repository template is capable of being used to create one or more repositories to hold storage area network data. The automatic repository generation process 140-2 finally creates the repository from the repository template, step 806.

Figure 9:
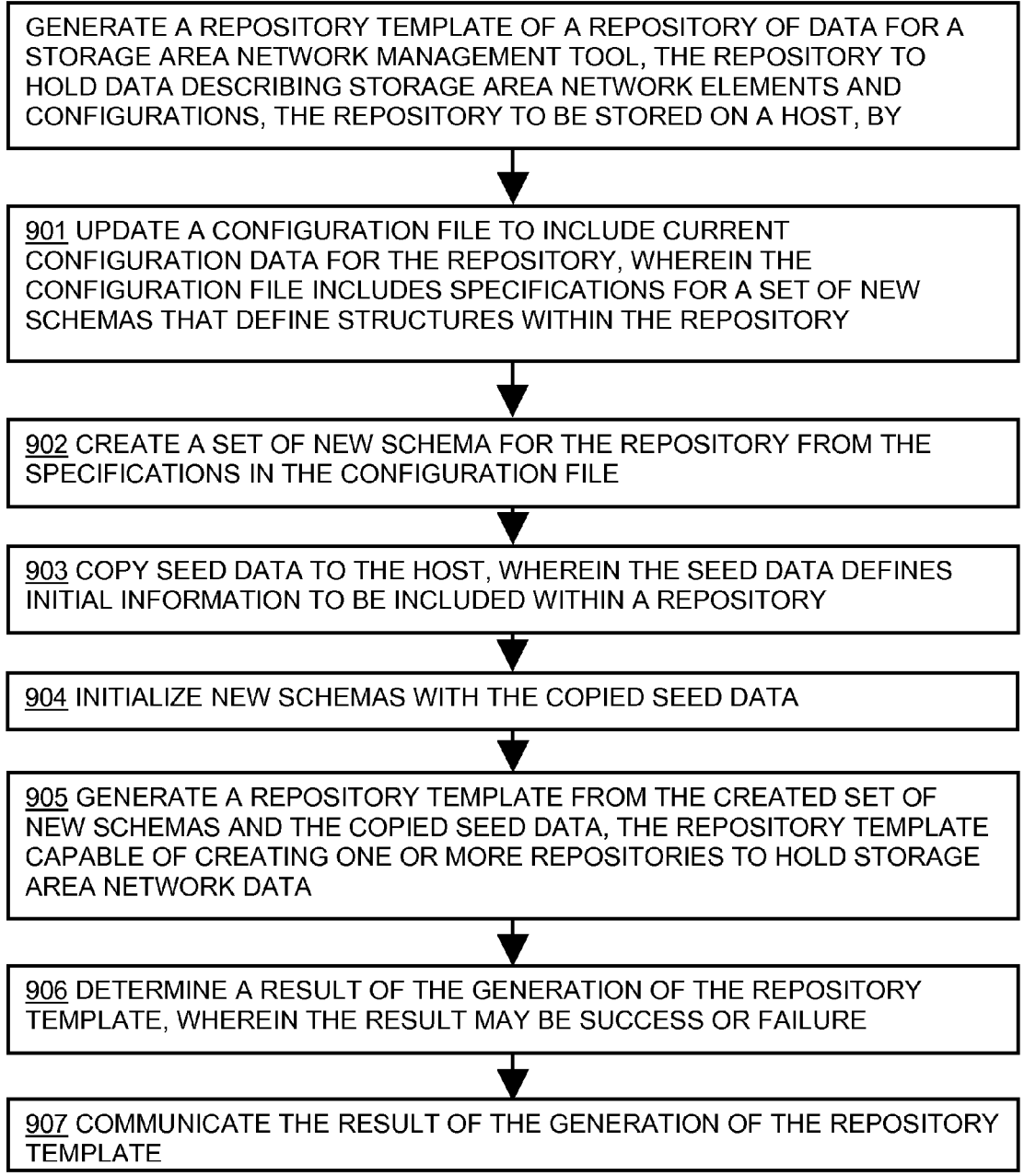
FIG. 9 illustrates a flowchart of a procedure performed by the system of FIG. 1 when communicating the result of the creation of a repository template.

In FIG. 9, the automatic repository generation process 140-2 communicates a result of the outcome of the automatic repository generation process 140-2. The automatic repository generation process 140-2 may perform any of the procedures described in FIGS. 2-8, prior to communicating the result. For example, FIG. 9 includes steps 901-905 that correspond to steps 201-205 of FIG. 2, which are described in greater detail with regards to FIG. 2. FIG. 9 may instead have included any of the steps shown in and described with regards to FIGS. 3-8. After the automatic repository generation process 140-2 has finished generating the repository template, the automatic repository generation process 140-2 determines a result of the generation of the repository template, step 906. The result may be, but is not limited to, indicating success or failure. That is, the result will indicate whether the repository template was created (success) or whether the repository template was not created (failure). The automatic repository generation process 140-2 may be programmed to determine other results, such as results that are particular to certain errors or otherwise result in particular error messages. The automatic repository generation process 140-2 will then communicate the result of the generation of the repository template, step 907. In one embodiment, the result of the generation of the repository template is communicated via e-mail to one or more users (such as the user 108 shown in FIG. 1, who may be an administrator of the storage area network). Other communications may be used, such as but not limited to a telephone message, a voice mail message, a message sent by SMS service, or a visible or audible alert. The communication may include other data in addition to the result, such as but not limited to a list of all script files successfully executed by the automatic repository generation process 140-2 or other data about the generation of the repository template.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of generating a repository template of a repository of data for a storage area network management tool, the repository defined to hold data describing storage area network elements and configurations, the method comprising:
   updating a configuration file to include current configuration data for a first repository, wherein the configuration file includes specifications for a set of schemas defining at least one repository structure;
   using configuration data from the configuration file to access the first repository currently stored on a host;
   removing any schemas and data currently stored by the first repository;
   creating a set of new schemas for the first repository according to the specifications from the configuration file;
   copying seed data to the host, wherein the seed data defines initial repository information;
   initializing the set of new schemas with the seed data;
   upon initializing the set of new schemas, generating a repository template from the set of new schemas and the seed data, the repository template defined for creating one or more repositories to hold storage area network data;
   creating a second repository from the repository template, wherein the second repository includes the seed data and the set of new schemas;
   establishing a test environment based on the repository template; wherein establishing the test environment includes:

(i) exporting each schema in the set of new schemas into the test environment;

(ii) replacing the seed data in each exported schema with data from at least one live storage area network (SAN);

(iii) upon determining that each exported new schema properly handles data from the live SAN, indicating, in the test environment, that the second repository is acceptable;

loading a prior version of the repository onto the host;

comparing the schemas of the prior version of the repository with the schemas of the second repository to determine any differences; and creating at least one script that, when executed on a repository based on the prior version of the repository, will upgrade schemas according to the set of new schemas in the second repository; via the test environment, receiving a correction of at least one schema in the set of new schemas, wherein receiving the correction includes:

upon determining that at least one exported schema does not properly handle the data from the live SAN:

resolving at least one incompatibility between at least one portion of data from the live SAN and an exported new schema.

2. The method of claim 1 wherein creating a set of new schemas comprises:

placing a set of scripts in a single script file, wherein the set of scripts comprises scripts defined for generating the repository template; and wherein generating the repository template comprises:

executing the single script file.

3. The method of claim 1 comprising:

exporting a copy of the second repository; and using the exported copy of the second repository to troubleshoot errors in the second repository.

4. The method of claim 1 comprising:

copying the repository template to a location, wherein copying signals an install kit generator that the repository template is available; and generating an install kit from the repository template, wherein the install kit allow for a clean install of a repository on a respective host.

5. The method of claim 1 comprising:

testing a configuration of the host that will store the first repository prior to beginning creation of the second repository.

6. The method of claim 1 comprising:

creating a repository of data from the repository template, wherein the repository includes the seed data and the set of new schemas.

7. The method of claim 1 comprising:

determining a result of the generation of the repository template, wherein the result may be success or failure; and communicating the result of the generation of the repository template.

8. The method as in claim 1, wherein updating the configuration file to include current configuration data for the repository includes:

creating the specifications for the configuration file, the specifications for at least one first new schema, wherein the first new schema is designed to hold data that has not been previously collected for storage in the first repository.

9. The method as in claim 1, wherein updating the configuration file to include current configuration data for the repository includes:

creating the specifications for the configuration file, the specifications for at least one first new schema, wherein the first new schema differs from any schemas found in the first repository.

10. The method as in claim 1, wherein updating the configuration file to include current configuration data for the repository includes:

creating the specifications for the configuration file, the specifications for at least one first new schema, the first new schema describing a reorganization of data currently in the first repository, wherein the data currently in the first repository relates to respective storage area network components, wherein the first new schema further includes at least one definition of a storage space not included in the first repository.

11. A computer system comprising:

a memory;

a processor;

a display;

a communications interface;

an interconnection mechanism coupling the memory, the processor, the display, and the communications interface, allowing communication there between;

wherein the memory is encoded with an automatic repository generation application, that when executed in the processor, provides an automatic repository generation process that generates a repository template of a repository of data for a storage area network management tool by causing the computer system to perform the operations of:

updating a configuration file to include current configuration data for a first repository, wherein the configuration file includes specifications for a set of schemas defining at least one repository structure, wherein the repository is defined for holding data describing storage area network elements;

using configuration data from the configuration file to access the first repository currently stored on a host;

removing any schemas and data currently stored by the first repository;

creating a set of new schemas for the first repository according to the specifications from the configuration file;

copying seed data to the host, wherein the seed data defines initial repository information;

initializing the set of new schemas with the seed data;

upon initializing the set of new schemas, generating a repository template from the set of new schemas and the seed data, the repository template defined for creating one or more repositories to hold storage area network data;

creating a second repository from the repository template, wherein the second repository includes the seed data and the set of new schemas;

establishing a test environment based on the repository template; wherein establishing the test environment includes:

(i) exporting each schema in the set of new schemas into the test environment;

(ii) replacing the seed data in each exported schema with data from at least one live storage area network (SAN);

(iii) upon determining that each exported new schema properly handles data from the live SAN, indicating, in the test environment, that the second repository is acceptable;

loading a prior version of the repository onto the host;

comparing the schemas of the prior version of the repository with the schemas of the second repository to determine any differences; and creating at least one script that, when executed on a repository based on the prior version of the repository, will upgrade schemas according to the set of new schemas in the second repository; via the test environment, receiving a correction of at least one schema in the set of new schemas, wherein receiving the correction includes:

upon determining that at least one exported schema does not properly handle the data from the live SAN:

resolving at least one incompatibility between at least one portion of data from the live SAN and an exported new schema.

12. The computer system of claim 11 wherein creating a set of new schemas comprises:

placing a set of scripts in a single script file, wherein the set of scripts comprises scripts defined for generating the repository template;

and wherein generating the repository template comprises: executing the single script file.

13. A computer program product, stored on computer readable medium, to generate a repository template of a repository of data for a storage area network management tool, the computer program product comprising:

computer program code for updating a configuration file to include current configuration data for a first repository, wherein the configuration file includes specifications for a set of schemas defining at least one repository structure, wherein the repository is defined for holding data describing storage area network elements;

computer program code for using configuration data from the configuration file to access the first repository currently stored on a host;

computer program code for removing any schemas and data currently stored by the first repository;

computer program code for creating a set of new schemas for the first repository according to the specifications from the configuration file;

computer program code for copying seed data to the host, wherein the seed data defines initial repository information;

computer program code for initializing the set of new schemas with the seed data;

computer program code for generating a repository template from the set of new schemas and the seed data upon initializing the set of new schemas, the repository template defined for creating one or more repositories to hold storage area network data;

computer program code for creating a second repository from the repository template, wherein the second repository includes the seed data and the set of new schemas;

computer program code for establishing a test environment based on the repository template; wherein establishing the test environment includes:

(i) computer program code for exporting each schema in the set of new schemas into the test environment;

(ii) computer program code for replacing the seed data in each exported schema with data from at least one live storage area network (SAN);

(iii) computer program code for indicating, in the test environment, that the second repository is acceptable upon determining that each exported new schema properly handles data from the live SAN;

computer program code for loading a prior version of the repository onto the host;

computer program code for comparing the schemas of the prior version of the repository with the schemas of the second repository to determine any differences; and computer program code for creating at least one script that, when executed on a repository based on the prior version of the repository, will upgrade schemas according to the set of new schemas in the second repository;

computer program code for receiving a correction, via the test environment, of at least one schema in the set of new schemas, wherein receiving the correction includes:

computer program code for determining that at least one exported schema does not properly handle the data from the live SAN;

computer program code for resolving at least one incompatibility between at least one portion of data from the live SAN and an exported new schema upon determining that at least one exported schema does not properly handle the data from the live SAN.

14. The computer program product of claim 13 wherein computer program code for creating a set of new schemas comprises:

computer program code for placing a set of scripts in a single script file, wherein the set of scripts comprises scripts defined for generating the repository template;

and wherein generating the repository template comprises: computer code for executing the single script file.

\* \* \* \* \*